(12) United States Patent
Reilley

(10) Patent No.: US 9,181,045 B2
(45) Date of Patent: Nov. 10, 2015

(54) PARTICULATE MEDIA CONVEYING SYSTEMS AND APPARATUSES

(71) Applicant: Edward M. Reilley, Granada Hills, CA (US)

(72) Inventor: Edward M. Reilley, Granada Hills, CA (US)

(73) Assignee: Comco Inc., Burbank, CA (US)

( * ) Notice: Subject to any disclaimer, the term of this patent is extended or adjusted under 35 U.S.C. 154(b) by 0 days.

(21) Appl. No.: 14/738,277

(22) Filed: Jun. 12, 2015

(65) Prior Publication Data

US 2015/0274443 A1 Oct. 1, 2015

Related U.S. Application Data

(62) Division of application No. 13/780,790, filed on Feb. 28, 2013, now Pat. No. 9,085,065.

(51) Int. Cl.
B65G 53/46 (2006.01)
B65G 53/40 (2006.01)
B65G 53/60 (2006.01)
B65G 53/12 (2006.01)

(52) U.S. Cl.
CPC ............... B65G 53/40 (2013.01); B65G 53/12 (2013.01); B65G 53/60 (2013.01)

(58) Field of Classification Search
USPC .............. 406/1, 120, 127, 156, 181; 137/255, 137/266, 597; 72/53; 29/DIG. 36
See application file for complete search history.

(56) References Cited

U.S. PATENT DOCUMENTS

| | | | | |
|---|---|---|---|---|
| 1,482,495 A * | 2/1924 | Westhaver | ............ | A01M 9/003 222/226 |
| 1,864,740 A * | 6/1932 | Knapp | ................ | A01M 9/0092 222/410 |
| 2,672,189 A * | 3/1954 | Welch | ....................... | F02B 1/00 137/266 |
| 3,044,666 A * | 7/1962 | Dyer | ................... | B67D 3/0012 137/266 |
| 4,172,580 A | 10/1979 | Raftis | | |
| 4,268,005 A | 5/1981 | Raftis | | |
| 4,303,222 A | 12/1981 | Campbell | | |
| 4,372,528 A | 2/1983 | Raftis | | |
| 4,492,253 A | 1/1985 | Raftis | | |
| 4,523,738 A | 6/1985 | Raftis | | |
| 4,541,452 A * | 9/1985 | Paradis | ................ | B01D 15/163 137/209 |
| 4,564,043 A * | 1/1986 | Trittler | ................... | G05B 19/44 137/624.18 |

(Continued)

OTHER PUBLICATIONS abdeburrer.com, Feb. 21, 2013, Internet printout: http://www.abdeburr.com/ProductDetails.aspx?ProdID=138.

(Continued)

Primary Examiner — Joseph Dillon, Jr.
(74) Attorney, Agent, or Firm — Vested Law

(57) ABSTRACT

Novel systems and apparatuses for conveying particulate media are disclosed. One such system may include a conveying tank configured to receive media and push it out to a media distribution valve to be distributed to any desired destination. The media distribution valve is preferably a multi-port, pinch valve having a drain to dump any residual media not distributed through the distribution valve. One or more blast dispensers may be in communication with the media distribution valve. Each blast dispenser may be in communication with a blast chamber, which also may be in communication with the media distribution valve. A screen classifier may be in communication with the media distribution valve to receive and screen media from the blast chamber, for example, before being conveyed, if desired, through one or more conveying tanks through the media distribution valve.

9 Claims, 6 Drawing Sheets

(56) References Cited

U.S. PATENT DOCUMENTS

| | | | |
|---|---|---|---|
| 4,585,031 A | 4/1986 | Raftis | |
| 4,607,663 A | 8/1986 | Raftis | |
| 4,763,527 A | 8/1988 | Raftis | |
| 4,838,145 A * | 6/1989 | Slocum | F15B 13/07 137/625.23 |
| 4,889,452 A * | 12/1989 | Heyl | B65G 53/66 406/109 |
| 5,282,314 A | 2/1994 | Raftis | |
| 5,931,197 A | 8/1999 | Raftis | |
| 6,016,839 A | 1/2000 | Raftis | |
| 6,213,307 B1 * | 4/2001 | Stein | B07B 4/02 209/134 |
| 6,314,978 B1 * | 11/2001 | Lanning | B64G 1/402 137/1 |
| 6,372,140 B2 | 4/2002 | Kelly | |
| 6,412,514 B1 | 7/2002 | Raftis | |
| 6,561,225 B2 | 5/2003 | Raftis | |
| 6,585,005 B1 | 7/2003 | Raftis | |
| 6,623,215 B2 * | 9/2003 | Dietrich | B05B 7/1459 406/197 |
| 6,923,421 B2 | 8/2005 | Raftis | |
| 6,953,059 B2 | 10/2005 | Raftis | |
| 7,104,279 B2 | 9/2006 | Raftis | |
| 7,163,359 B2 * | 1/2007 | Moser | B05B 7/1459 406/151 |
| 7,476,265 B2 * | 1/2009 | Firman | B65G 69/182 222/105 |
| 8,491,226 B2 * | 7/2013 | Kleineidam | B05B 7/1459 406/13 |
| 8,820,355 B2 * | 9/2014 | Sutton | F16K 31/52483 137/119.07 |
| 2007/0028971 A1 * | 2/2007 | Wagner | B01D 53/0446 137/625.15 |
| 2008/0257417 A1 * | 10/2008 | Thomaschki | F16K 1/446 137/266 |
| 2009/0242045 A1 * | 10/2009 | Jennings | F16K 27/0236 137/510 |
| 2012/0247595 A1 | 10/2012 | Raftis | |
| 2014/0373940 A1 * | 12/2014 | Toader, Jr. | F16L 55/07 137/267 |

OTHER PUBLICATIONS azo.com, Feb. 21, 2013, Internet printout: http://www.azo.com/products/pneumatic-conveying-systems/.

carolinaconveying.com, Feb. 21, 2013, Internet printout: http://www.carolinaconveying.com/body_diverter_valves.htm.

carolinaconveying.com, Feb. 21, 2013, Internet printout: http://www.carolinaconveying.com/CC_Plug_Diverter.pdf.

pangborngroup.com, Feb. 21, 2013, Internet printout: http://www.pangborngroup.com/Products/Shot-Peening/Spring-Shot-Peening.aspx.

cycloneair.com, Feb. 21, 2013, Internet printout: http://www.cyclonaire.com/products/components/pinch_diverter.

disamachinery.com, Feb. 21, 2013, Internet printout: http://www.disamachinery.com/en/product.asp?f=42.

bushandwilton.com, Feb. 21, 2013, Internet printout: http://www.bushandwilton.com/usa/divert.htm.

dynamicair.com, Feb. 21, 2013, Internet printout: http://www.dynamicair.com/systems/hdp1000.html.

dynamicair.com, Feb. 21, 2013, Internet printout: http://www.dynamicair.com/systems/hdp2000.html.

dynamicair.com, Feb. 21, 2013, Internet printout: http://www.dynamicair.com/systems/hdp3000.html.

dynamicair.com, Feb. 21, 2013, Internet printout: http://www.dynamicair.com/systems/hdp4000.html.

dynamicair.com, Feb. 21, 2013, Internet printout: http://www.dynamicair.com/systems/hdp5000.html.

engineeredabrasives.com, Feb. 21, 2013, Internet printout: http://www.engineeredabrasives.com/.

goff-inc.com, Feb. 21, 2013, Internet printout: http://www.goff-inc.com/goff-shot-blast-machines.asp.

guyson.com, Feb. 21, 2013, Internet printout: http://www.guyson.com/blast/shotpeening/automotive.php.

ktron.com, Feb. 21, 2013, Internet printout: http://www.ktron.com/process-equipment/pneumatic-conveying/technology/how-pressure-conveying-works.cfm.

ipeenglobal.com, Feb. 21, 2013, Internet printout: http://www.ipeenglobal.com/.

kaitaishotblasting.en.alibaba.com Feb. 21, 2013, Internet printout: http://kaitaishotblasting.en.alibaba.com/productlist.html.

kice.com, Feb. 21, 2013, Internet printout: http://www.kice.com/Product-DiverterValves.html.

ktronpremier.com Feb. 21, 2013, Internet printout: http://www.ktronpremier.com/pneumatic_conveying_components/Valves/index.cfm.

metfin.com, Feb. 21, 2013, Internet printout http://www.metfin.com/products/shot-peening/.

vortexvalves.com, Feb. 21, 2013, Internet printout: http://www.vortexvalves.com/multi-port-wye-line-diverter/.

peentech.com, Feb. 21, 2013, Internet printout: http://peentech.com/equipment.cfm.

peentech.com, Feb. 21, 2013, Internet printout: http://peentech.com/cncRobotics.cfm.

pneumaticconveyingsolutions.com, Feb. 21, 2013, Internet printout: http://www.pneumaticconveyingsolutions.com/.

ktron.com, Feb. 21, 2013, Internet printout: http://www.ktron.com/process-equipment/pneumatic-conveying/technology/technology-overview.cfm.

flexicon.com, Feb. 21, 2013, Internet printout: http://www.flexicon.com/us/products/pneumaticconveyingsystems/index.asp.

progressivesurface.com, Feb. 21, 2013, Internet printout: http://www.progressivesurface.com/shotpeening.php.

rosler.us, Feb. 21, 2013, Internet printout: http://www.rosler.us/products/shot_blasting_equipment/.

shockform.com, Feb. 21, 2013, Internet printout: http://shockform.com/.

shotking.com, Feb. 21, 2013, Internet printout: http://www.shotking.com/products.

products.empire-airblast.com, Feb. 21, 2013, Internet printout: http://products.empire-airblast.com/viewitems/automated-systems/shot-peening-machines.

wheelabratorgroup.com, Feb. 21, 2013, Internet printout: http://www.wheelabratorgroup.com/us/sites/wheelabrator/content/equipment/shot_peening_equipment.aspx?lang=en -us&redirect=3&.

sapanashotblast.com, Feb. 21, 2013, Internet printout: http://www.sapanashotblast.com/shot-blasting-machines.html.

sfecindia.net, Feb. 21, 2013, Internet printou: http://www.sfecindia.net/blast-room.aspx.

* cited by examiner

PARTICULATE MEDIA CONVEYING SYSTEMS AND APPARATUSES

CROSS-REFERENCE TO RELATED APPLICATION

The present application is a divisional of U.S. patent application Ser. No. 13/780,790 filed on Feb. 28, 2013 entitled "Particulate Media Conveying Systems and Apparatuses," the entire contents of which are hereby incorporated by reference herein.

BACKGROUND

The present disclosure relates generally to conveying technologies and particularly to particulate media conveying systems and apparatuses.

Myriad techniques exist to convey particulate media in many different industries. One technique involves pneumatic conveying typically used for bulk solids. These systems may be categorized as vacuum or negative pressure, positive pressure, or a combination of the two. They can be operated in dilute-phase where there is a lot of air and the media moves quickly, or in dense-phase where the media moves slowly or in gulps.

Vacuum systems are limited to a 15 psi pressure differential (absolute vacuum) so they are limited in how hard they can pull the media along, but this technique is by far the most common way to convey pneumatically. Very low bulk density materials will get blown around in even the slightest breeze. Cereals, powders, and grains are also easily moved with vacuum. As the intake is atmospheric, a pick-up wand may be pushed down into the bulk solid and it will get vacuumed up. However, materials with higher bulk density, such as steel shot that is physically dense and aerodynamic, will not convey or convey very slowly. Indeed, a vertical vacuum pipe will have a hard time lifting a heavy and aerodynamic particle because the air just goes around it.

Positive pressure conveying systems are not limited to 15 psi. The media to be conveyed is put into a closed vessel that is subsequently pressurized. The vessel is typically shaped so the pressurized air tries to escape the vessel through the media, pushing the media along.

Screw conveyors are another popular conveying technology. A long pipe has a helical feed wire or screw put down the middle. Turning either the screw (typical) or tube (rare) will cause media to feed up the tube. The tube has a limit to how steep it can be, particularly with free-flowing materials.

Bucket elevators are large and mechanically complex systems where a series of buckets ride along on a pair of chains. The buckets are passed under a pick-up station where media is deposited. The buckets then follow the conveyor, usually upwards and sideways only, to a single drop-off station where the buckets are inverted. Such systems are quite varied. For example, some may be belt driven, employ a continuous belt instead of buckets, manufactured from a variety of different materials, etc.

The vast majority of particulate media conveying systems for shot peening use vacuum conveying or bucket elevators. Vacuum conveying limits these systems to using smaller media, as larger media will not convey up long vertical runs, as discussed above. The bucket elevators are used in machines that may put out hundreds to thousands of pounds of shot per minute. These technologies are both single pick-up and single drop-off. In an effort to overcome the one-source to one-destination shortcoming, these systems stack all their equipment and use gravity to convey between items. Consequently, very tall machines must be employed that have only one flow path the media can follow. Conventional shot peen systems are thus typically enormous, expensive, and limited to conveying media with a single pick-up and drop-off.

Accordingly, novel systems and apparatuses for conveying multiple medias with minimization or elimination of cross-contamination, with multiple pick-up and drop-off locations, and compact size are therefore desired.

SUMMARY

One exemplary embodiment of the disclosed subject matter is a system including a conveying tank and a media distribution valve in communication with the conveying tank. The media distribution valve preferably comprises a vertical central passageway, a first particulate media resistant valve connected to and angled away from the vertical central passageway, a second particulate media resistant valve connected to and angled away from the vertical central passageway, and a third particulate media resistant valve connected to and extending axially away from the vertical central passageway.

Another exemplary embodiment of the disclosed subject matter is a system comprising a screen, a conveying tank disposed proximate the screen for containing media, a working fluid inlet in communication with the conveying tank for pushing media out of the conveying tank, and a media distribution valve in communication with the conveying tank.

A further exemplary embodiment of the disclosed subject matter is a system comprising a conveying tank, a media distribution valve in communication with the conveying tank, and a media receiver in communication the media distribution valve, wherein the media receiver is configured to receive media centripetally, whereby received media spirals around an inner wall of the media receiver while slowing.

BRIEF DESCRIPTION OF THE DRAWINGS

Some non-limiting exemplary embodiments of the disclosed subject matter are illustrated in the following drawings. Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described. Dimensions of components and features shown in the figures are chosen for convenience or clarity of presentation. For convenience or clarity, some elements or structures are not shown or shown only partially and/or with different perspective or from different point of views.

DETAILED DESCRIPTION

A general problem in the field of conveying systems is the use of negative pressure or bucket elevators that pick up media from only a single location and drop off media to only a single location. A general solution is the use of a positive pressure conveying system with valving that advantageously allows for multiple pick-up locations and multiple drop-off locations.

A technical problem in the field of media conveying systems is conveying more than one media type from more than single pick-up location to more than a single drop-off location. A technical solution implementing the spirit of the disclosed inventions is the use of a media distribution valve in communication with conveying tanks having different media contained therein and media receivers to receive the various medias.

Potential benefits of the general and technical solutions provided by the disclosed subject matter include those identified above plus minimal (or zero) cross-contamination of different media. The disclosed inventions also advantageously have the ability to handle an unlimited number of sources and deliver them to one or more destinations in one conveying system. Moreover, the disclosed inventions are small compared to conventional negative pressure or bucket conveying systems that are typically large and expensive.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

Figure 1:
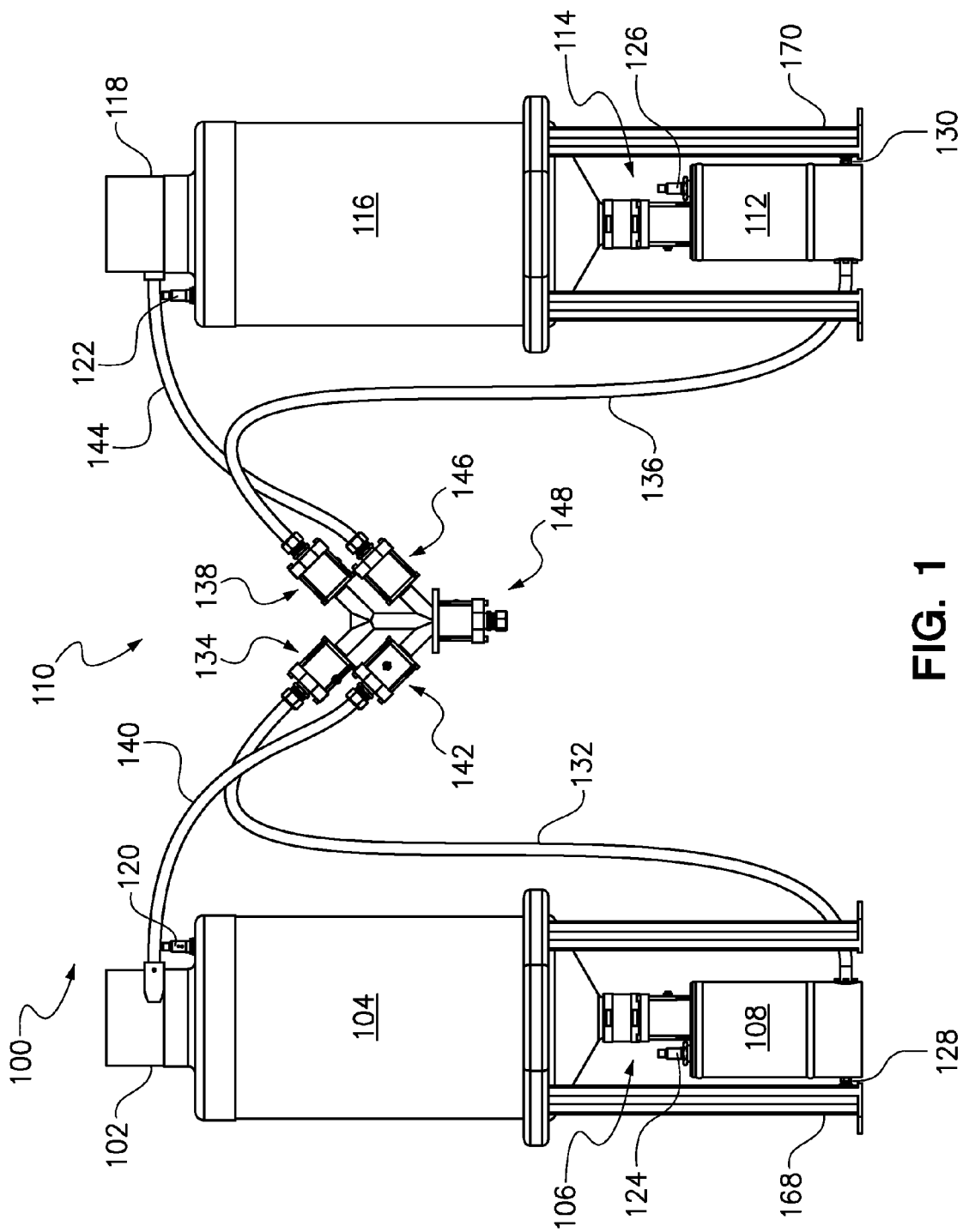
FIG. 1 is a view of a media conveying system according to an embodiment of the inventions disclosed herein showing an example configuration.

FIG. 1 is a view of a media conveying system according to an embodiment of the inventions disclosed herein showing an example configuration. Turning in detail to FIG. 1, a media conveying system 100 may be seen having a media receiver 102 in communication with a media storage hopper 104. The media receiver 102 may receive media that may be abrasive or non-abrasive materials including but not limited to (1) typically highly pure, micron-size fine powders (usually 10 to 150 microns) formed from such materials as crushed glass, silicon carbide, and aluminum oxide; (2) micron-size shot peening material (typically 150 microns or finer) such as glass bead or zirconia media; or (3) standard-sized shot peening material (typically 0.007 in to 0.060 in) such as cast or wrought steel, stainless steel, glass bead, or zirconia; or (4) any combination of the above. Advantageously, the conveying systems disclosed herein have no theoretical upper limit concerning the size of the media to be conveyed.

The media storage hopper 104, which may be supported by frame member 168, is in communication with a conveying tank 108. A particulate media resistant valve 106 is disposed between hopper 104 and tank 108. Conveying tank 108 is in communication with a media distribution valve 110 via a hose 132. Hose 132, as with other hoses used herein, may be flexible or rigid.

Media received via media receiver 102 may enter hopper 104, pass through valve 106, and held within tank 108 to be conveyed through media distribution valve 110 to another destination. FIG. 1 illustrates such a destination may be a second media receiver 118, media receiver 102, or a drain valve 148 to an unspecified destination. However, any number of destinations may be configured, such as to a blast dispenser unit, a waste drum, etc. Moreover, the particular configuration shown in FIG. 1 is merely illustrative in that hose 132 need not be connected to media distribution valve 110 but instead may be connected directly to a media receiver or merely used as a hose to move media into a storage barrel, for example.

The wide-ranging uses of the disclosed inventions are further exemplified when more than one media source is inputted through a media distribution valve resulting in the ability to handle an unlimited number of sources and deliver them to one or more destinations in the conveying system. FIG. 1 shows an example of how a second media source may be inputted into and through the media distribution valve 110. FIG. 1 particularly illustrates a second media receiver 118 in communication with a second media storage hopper 116. The media storage hopper 116, which may be supported by frame member 170, is in communication with a second conveying tank 112. A particulate media resistant valve 114 is disposed between hopper 116 and tank 112. Conveying tank 112 is in communication with media distribution valve 110 via a hose 136. As with the first conveying tank 108 arrangement, media input into media distribution valve 110 from conveying tank 112 may advantageously be output out of media distribution valve 110 to any destination, such as media receiver 102, media receiver 118, or out drain 148. Again, the particular configuration shown in FIG. 1 is merely illustrative in that other destinations may be configured through valve 110. Indeed, hose 136 need not be connected to media distribution valve 110 but instead may be connected directly to a media receiver or merely used as a hose to move media into a storage barrel, for example.

Conveying system 100 also includes a working fluid inlet 128 in communication with conveying tank 108 to allowing a working fluid to push media out of tank 108 and through hose 132 to reach the media distribution valve 110. The working fluid is preferably clean, dry air. Conveying tank 108 preferably includes a "full" sensor to tell electronics (now shown) when to close particulate media distribution valve 106 to start conveying. Alternatively, sensor 124 may be a level sensor. Similar to conveying tank sensor 124, storage hopper 104 may contain a "full" sensor 120 to tell electronics (not shown) that this destination should not receive any more media. Alternatively, sensor 120 may be a level sensor. As seen on the right side of FIG. 1, conveying tank 112 may also include a sensor 126, and storage hopper 116 may include a storage hopper sensor 122.

Figure 2:
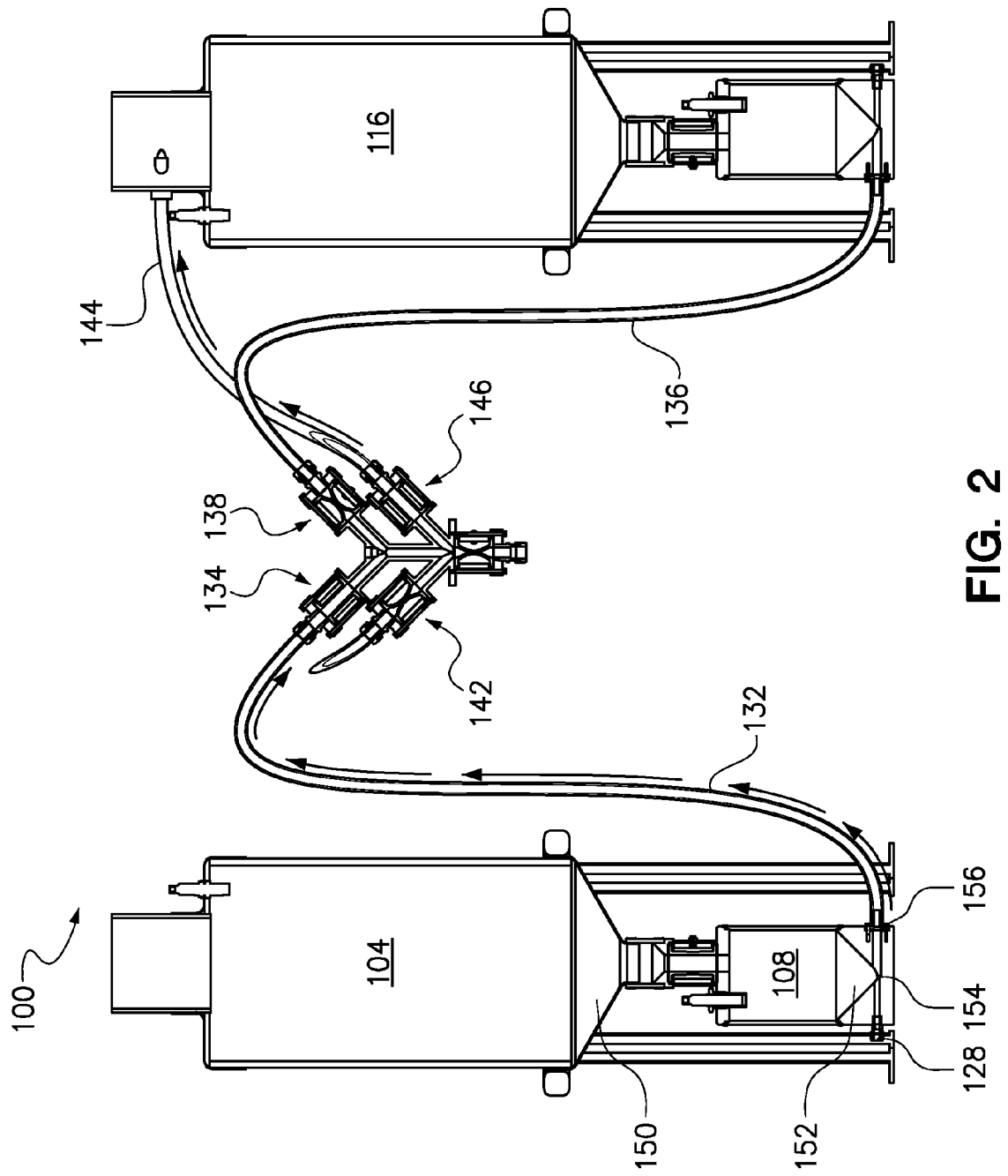
FIG. 2 is a cross-section view of the media conveying system illustrated in FIG. 1.
Figure 4:
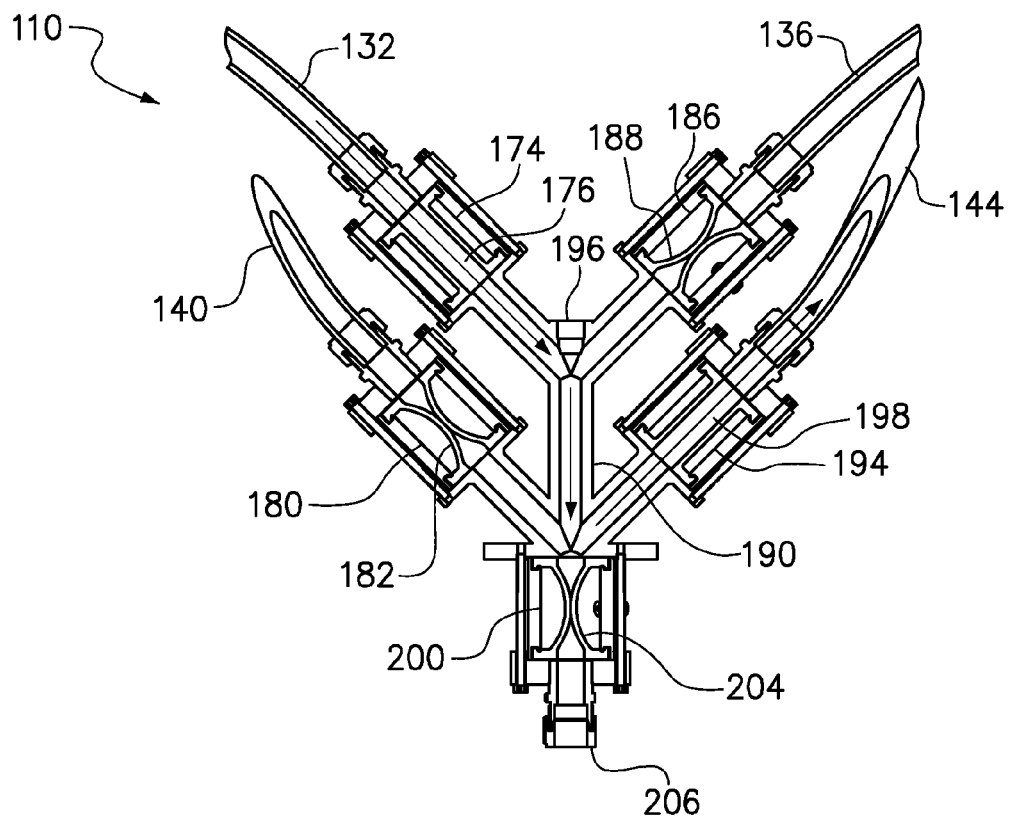
FIG. 4 is a cross-section view of the media distribution valve illustrated in FIG. 1.

The disclosed inventions may use a media distribution valve having any number of inputs and outputs. FIGS. 1, 2, and 4 illustrate an example media distribution valve 110 comprising two input valves 134 and 138, two output valves 146 and 142, and a drain valve 148. Hose 132 connects conveying tank 108 to input valve 134, whereas hose 136 connects conveying tank 112 to input valve 138. A hose 140 connects output valve 142 to media receiver 102, whereas hose 144 connects output valve 146 to media receiver 118.

FIG. 2 is a cross-section view of the system 100 illustrated in FIG. 1. As seen in FIG. 2, storage hopper 104 preferably includes a conic bottom 150 to help feed media stored in storage hopper 104 through the particulate media valve 106 and into conveying tank 108. Conveying tank 108 also has a conic bottom 152 with a port 154 in communication with working fluid inlet 128 and a tank fitting 156, which in turn connects hose 132 to conveying tank 108. A similar arrangement exists with storage hopper 116 and conveying tank 112, as shown on the right side of FIG. 2 illustrating a working fluid inlet 130 in communication with tank 112.

FIG. 2 also illustrates how media may be moved from conveying tank 108 to media receiver 118. In particular, gravity draws media (not shown) stored in storage hopper 104 through particulate media resistant valve 106 (shown open in FIG. 2) into conveying tank 108. Sensor 124 detects when the tank 108 is full to close valve 106. With valve 106 shut, air pressure is applied opposite the tank exit 154 via air inlet 128 to push media out fitting 156 and into hose 132. The media then travels through media distribution valve 110 via valve 134 and valve 146 (valves 138, 142, and drain valve 148 are closed as seen in FIG. 2) through hose 144 and into media receiver 118, where it falls into storage hopper 116.

Figure 3:
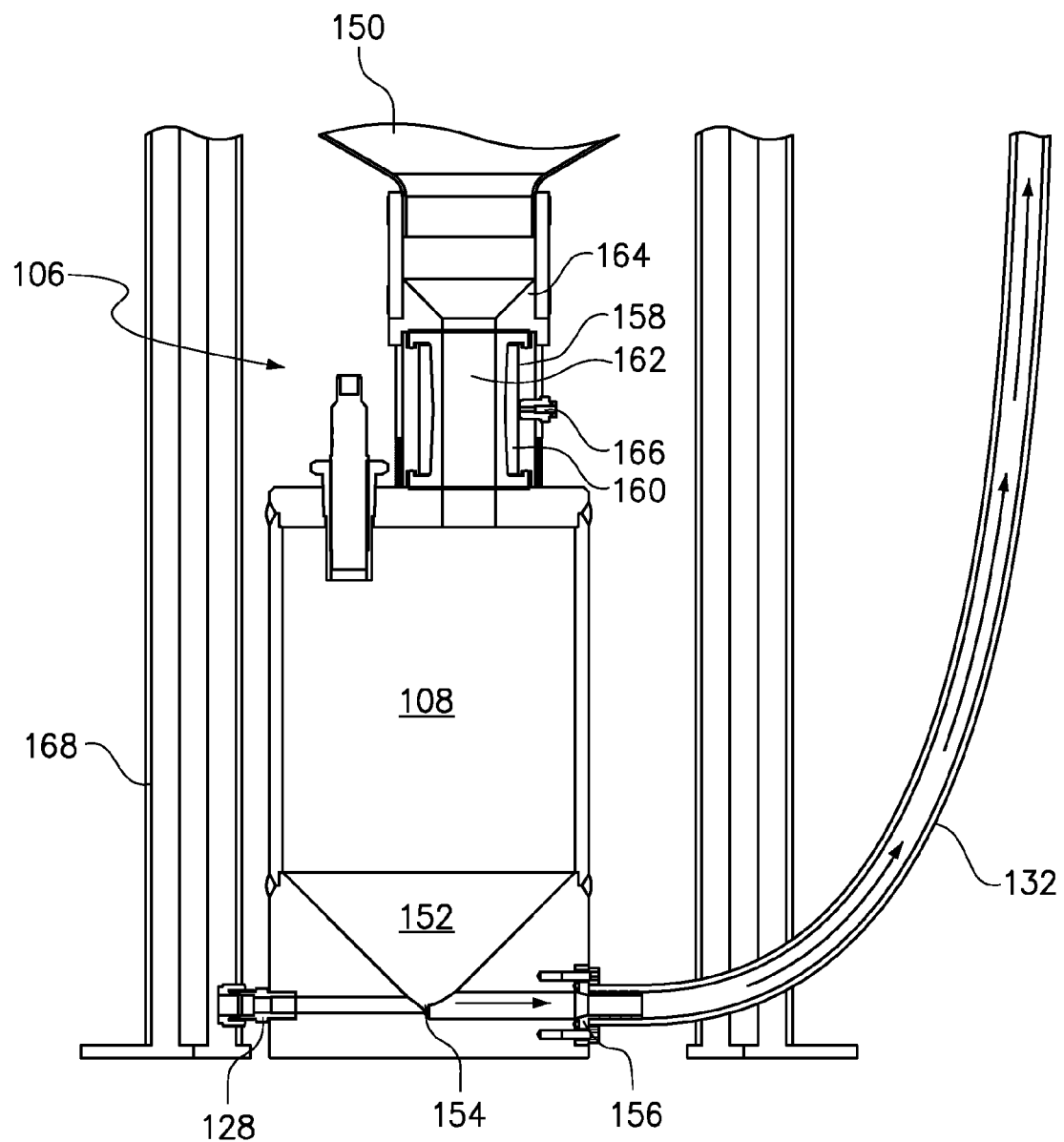
FIG. 3 is a detailed view of certain components of the media conveying system illustrated in FIG. 1.

FIG. 3 is a detailed view of certain components of the media dispensing system 100 illustrated in FIG. 1. FIG. 3 particularly shows particulate media resistant valve 106 and conveying tank 108. The preferred arrangement of particulate media resistant valve 106 is a pneumatic pinch valve. A pinch valve is preferred as it has a constant internal diameter with few nooks and crannies in which media may be trapped. Moreover, a pinch valve is able to close on a solid column of media, while also being relatively inexpensive and reliable. However, for any of the embodiments disclosed herein that utilize a pinch valve, other valves such as flapper valves, butterfly valves, poppet valves, or the like may be used.

Turning in detail to FIG. 3, particulate media resistant valve 106 may include a housing 158 containing a flexible sleeve 162 therein. The sleeve 162 has a receptor 164 about one end. Receptor 164 is preferably conic to eliminate places where media may collect. An air inlet 166 is disposed about the housing 158. In operation, once sensor 124 tells the control electronics (not shown) that the conveying tank 108 is full, then a remote air valve (not shown) is actuated to pass air through inlet 166 into housing 158. The area 160 inside the housing 158 but outside the sleeve 162 is then pressurized. This pressure causes the sleeve 162 to collapse and close (note, sleeve 162 in FIG. 3 is shown open). If any media is in the sleeve 162, the sleeve 162 will collapse on that media. Doing so prevents additional media from entering into the conveying tank 108. Once the sleeve 162 is closed, then as discussed above, push-air is applied through inlet 128 to convey media through hose 132 and media distribution valve 110. Inlet 128 is preferably at the bottom of conveying tank 108 in line with port 154 directly across from the exit of tank 108 to shoot air through the solid mass of media and directly into the conveying tube 132, leaning out the mixture and making the conveying very smooth. A flow meter (not shown) is preferably in communication with the working fluid inlet 128 to monitor how much push-air is being used. When the conveying path (108-132-110-destination) goes empty, the resistance the media added to the air stream disappears and the air consumption goes up. This event triggers when to stop pushing air through inlet 128.

FIG. 4 is a cross-section view of the media distribution valve 110 illustrated in FIG. 1. As seen in FIG. 4, media distribution valve 110 may comprise a vertical central passageway 190 in communication with one or more valves, such as input valves 134 and 138, output valves 142 and 146, and a drain 148. In particular, vertical central passageway 190 may be seen having a top end and an opposing bottom end, a first particulate media resistant valve 134 connected to and angled away from the top end of the vertical central passageway 190, a second particulate media resistant valve 138 connected to and angled away from the top end of the vertical central passageway 190, a third particulate media resistant valve 142 connected to and angled away from the bottom end of the vertical central passageway 190, a fourth particulate media resistant valve 146 connected to and angled away from the bottom end of the vertical central passageway 190, and a fifth particulate media resistant valve 148 connected to the bottom end of the vertical central passageway 190. The fifth particulate media resistant valve 148 is preferably axially aligned with and extends downward from the vertical central passageway 190. The particular geometry illustrated in FIG. 4 is helpful to help minimize any residual media that may need to be discarded through drain 148.

The top end of the vertical central passageway 190 may include an auxiliary air port 196 to provide air to clean out the media distribution valve 110 when conveying media sensitive to cross-contamination. To do so, valve 148 is open while all others 134, 138, 142, and 146 are closed to permit any residual media in the media valve 110 to be dumped to any desired destination out drain port 206. Alternatively, air port 196 may serve to apply extra conveying air for long runs.

Similar to particulate media resistant valve 106, valves 134, 138, 142, 146, and 148 are each preferably pneumatic pinch valves though other suitable valves may be used. Similar to particulate media resistant valve 106, valves 134, 138, 142, 146, and 148 may each include a housing that contains a pressurizable sleeve formed therein and an inlet (not shown) for pressurizing the housing to cause the sleeve to collapse and shut. In particular, valve 134 (shown open in FIGS. 2 and 4) may comprise housing 174 containing sleeve 176. Valve 138 (shown closed in FIGS. 2 and 4) may comprise housing 186 containing sleeve 188. Valve 142 (shown closed in FIGS. 2 and 4) may comprise housing 180 containing sleeve 182. Valve 146 (shown open in FIGS. 2 and 4) may comprise housing 194 containing sleeve 198. Valve 148 (shown closed in FIGS. 2 and 4) may comprise housing 200 containing sleeve 204.

The internal geometry with the media distribution valve that sees flow is preferably a constant cross section to minimize places for media to get trapped. The design of system 100 uses ½" ID hose, Swagelok fittings, ½" pinches, and ½" port sizes. However, the exact choice of diameter is not critical and can be sized for required flow rates.

Typical operation of system 100 involves having all but one input closed and one output closed, such as illustrated in FIGS. 2 and 4 wherein valve 138 is closed and valve 142 is closed. With this arrangement, the media then flows down at an angle through the inlet valve 134 and port, vertically down the central passageway 190, and then up at an angle out the outlet port and valve 146. Any media that inadvertently finds its way into closed ports will fall back into the stream because of the angle. When the conveying tank 108 runs empty, valves 134, 138, 142, and 146 are closed. About a thimble-full of media may remain at the bottom of the vertical central passageway 190 atop the drain valve 148. For users concerned with cross-contamination, the drain pinch 148 may be opened and the auxiliary air port 196 actuated to clean out the media distribution valve 110. Extra-thorough cleanout may require valves 134, 138, 142, and 146 to be temporarily opened and then closed to release any media that may be wedged into the pinch valve folds. All sensors, valves, and air flows are preferably controlled from one central location and a computer, although such control need not be centralized and not be via a computer but via other means such as a programmable logic controller or manual actuation.

Figure 6:
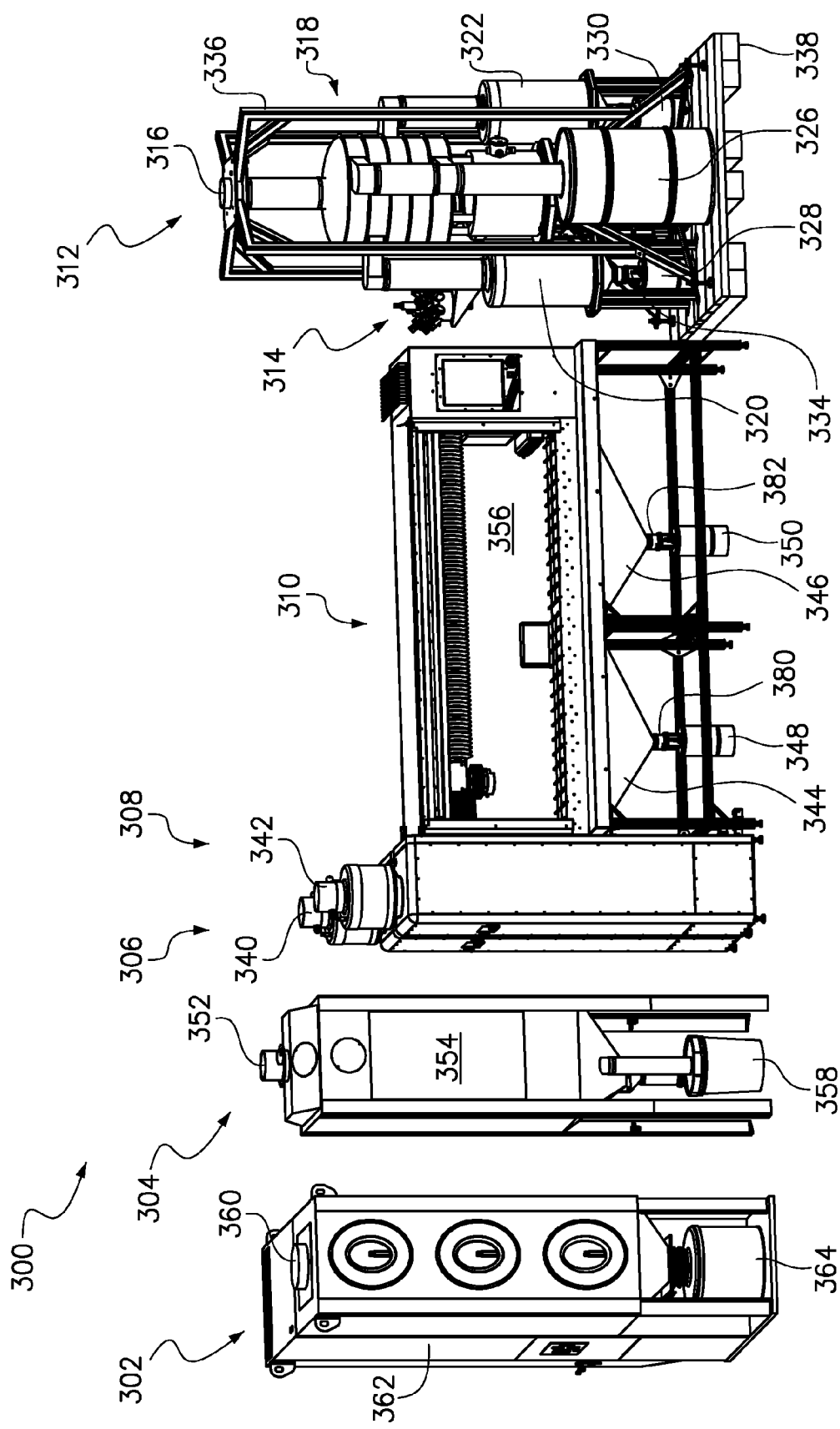
FIG. 6 is a perspective view of the front of a media conveying system according to another embodiment of the inventions disclosed herein.

The number of inlets and outlets of a media distribution valve of the disclosed inventions may vary depending on system requirements. The construction of the body of a media distribution valve of the disclosed inventions may also vary. For example, media distribution valve 110 seen in FIG. 1 may be a 2-in and 2-out cast design, whereas media distribution valve 314 seen in FIG. 6 is a 6-in and 6-out billet design machined from aluminum. Wear will be minimized with harder metals, but even aluminum gives good performance due to the slow speed of the media. Moreover, the inlets and outlets of a media distribution valve may all exist on one level with only a very short central passageway between the auxiliary air port and drain pinch, such as air port 196 and drain pinch 148 seen in FIG. 4. This arrangement may be more convenient or less costly in some cases but may result in more than a thimble of media being left over. The media distribution valve may grow very large if many ports are needed with such an arrangement.

The conveying systems disclosed herein advantageously may employ numerous media distribution valves in any one system. Such an arrangement is useful if the number of inputs and outputs get so high as to make the body of the media distribution valve unwieldy. Moreover, such an arrangement is also useful if the user wishes to convey media simultaneously along multiple paths.

Figure 5:
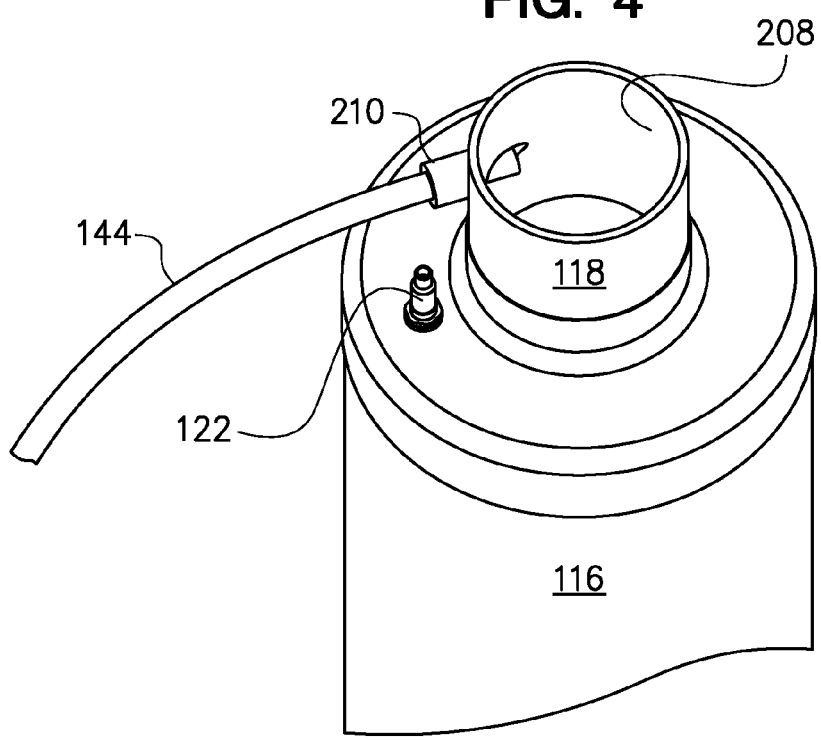
FIG. 5 is a perspective view of certain components of the media conveying system illustrated in FIG. 1.

FIG. 5 is a perspective view of certain components of the media conveying system illustrated in FIG. 1. Turning in detail to FIG. 5, media receiver 118 can be seen having a fitting 210 configured to receive hose 144. Hose 144 is preferably connected so it emerges tangent to the inside surface 208 of the media receiver 118. The hose 144 terminates to atmosphere. The pressure delta between the conveying tank and receiver 118 is what causes the media to flow. The media particularly comes out the hose 144 and slides along the inside of the receiver 118 and falls downward. Such a centripetal media receiver 118 advantageously minimizes wear on the media receiver 208 and the media itself. Multiple fittings 210 are possible on one media receiver to enable receipt from multiple sources.

A dust collection tube (not shown) may also be connected to the top of the media receiver 118 to remove the conveying air and any dust it may contain. Alternately, the top of the media receiver 118 could be connected to a filter, or even left open to the room. Media receiver 118 is preferably a steel tube. Media receiver 102 preferably has an identical arrangement as media receiver 118.

Figure 7:
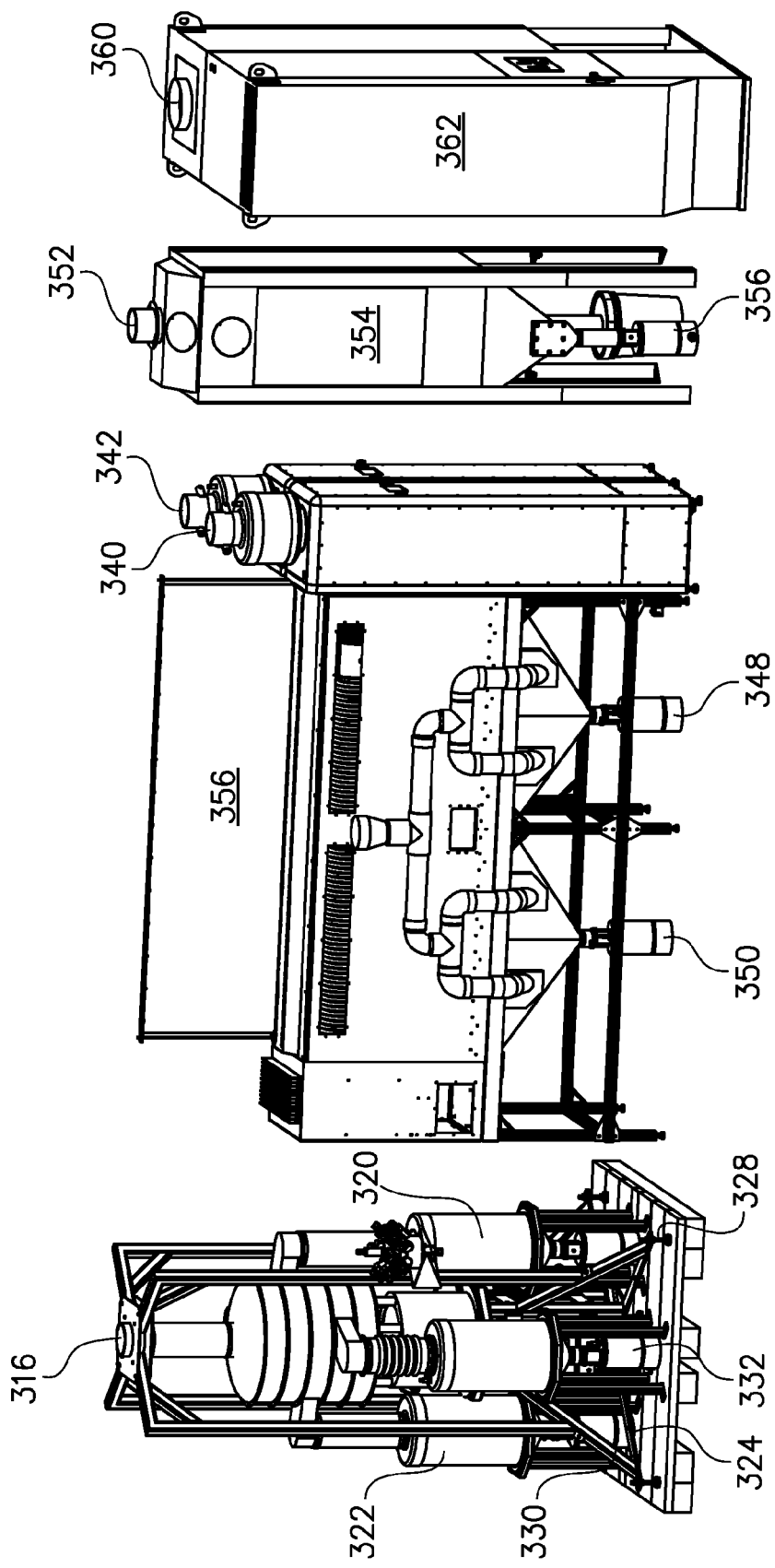
FIG. 7 is a perspective view of the back of the conveying system illustrated in FIG. 6.

FIGS. 6 and 7 are front and back perspective views, respectively, of a media conveying system according to another embodiment of the inventions disclosed herein. The illustrated system 300 is similar to system 100 disclosed above in that system 300 includes a conveying tank (such as tank 328, 330, 332, 348, 350, or 356) in communication with a media distribution valve (such as valve 314) and a media receiver (such as 316, 340, 342, or 352) to convey media as desired. System 300 also includes other components that advantageously allow the system to classify media for use/re-use in the system or to discard media depending on system requirements. Indeed, system 300 nicely fills the need of a user having a variety of parts that require different blasting or peening recipes, including different media sizes.

Turning in detail to FIGS. 6 and 7, system 300 comprises a conveying tank 328 connected to an inlet valve (not indicated) of the media distribution valve 314 via a hose (not shown). Similar to system 100, media received via a media receiver, such as media receiver 316, may enter a media storage hopper, such as hopper 320, pass through a particulate media resistant valve, such as valve 334, and held within tank 328 to be conveyed through the media distribution valve, such as media distribution valve 314, to another destination. For example, media may be conveyed from tank 328 through valve 314 through a hose (not shown) connected to a media receiver, such as media receiver 340 of blast dispenser unit 306 illustrated in FIGS. 6 and 7. As system 300 also allows media to be classified, a screen process unit 318 having one or more screens (not shown) to take out over-sized and under-sized media particles may be disposed between the media receiver 316 and storage hopper 320.

System 300 may also comprise a second conveying tank 330 connected to an inlet valve (not indicated) of the media distribution valve 314 via a hose (not shown). Similar to the arrangement with conveying tank 328, conveying tank 330 is preferably disposed beneath its own particulate media resistant valve (not shown), which is preferably disposed beneath its own media storage hopper 322. Storage hopper 322 is preferably in communication with screen process unit 318 that receives media via media receiver 316. Media received therein passes through screen process unit 318, and depending on the size of the media, may pass into media storage hopper 322, through the particulate media resistant valve associated with conveying tank 330 to be conveyed through the media distribution valve 314 to another destination. For example, media may be conveyed from tank 330 through valve 314 through a hose (not shown) connected to a media receiver, such as media receiver 342 of blast dispenser unit 308 illustrated in FIGS. 6 and 7.

System 300 may also comprise a third conveying tank 332 connected to an inlet valve (not indicated) of the media distribution valve 314 via a hose (not shown). Similar to the arrangement with conveying tanks 328 and 330, conveying tank 332 is preferably disposed beneath its own particulate media resistant valve (not indicated), which is preferably disposed beneath its own media storage hopper (not indicated). This storage hopper is preferably in communication with screen process unit 318 that receives media via media receiver 316. Media received therein passes through screen process unit 318, and depending on the size of the media, may pass into a media storage hopper, through the particulate media resistant valve associated with conveying tank 332 to be conveyed through the media distribution valve 314 to another destination. For example, media may be conveyed from tank 332 through valve 314 through a hose (not shown) connected to a media receiver, such as media receiver 340 or 342 illustrated in FIGS. 6 and 7.

The screen process unit 318 may also be in communication with a waste drum, such as waste drum 326. Media receiver 316, screen process unit 318, associated hoppers and waste drum 326, as well as associated conveying tanks may be supported by frame member 336, all of which may be situated on top of a palette 338 to comprise a screen classifier 312. Again, the system 300 is merely illustrative in that additional screen classifiers are possible with any number of associated hoppers.

System 300 may also comprise a fourth conveying tank 348 connected to an inlet valve (not indicated) of the media distribution valve 314 via a hose (not shown). Similar to the arrangement with conveying tanks 328, 330, and 332, conveying tank 348 is preferably disposed beneath its own particulate media resistant valve 380, which is preferably disposed beneath its own media storage hopper 344. Media received in storage hopper 344 may pass through particulate media resistant valve 380 and into conveying tank 348 to be conveyed through the media distribution valve 314 to another destination. For example, media may be conveyed from tank 348 through valve 314 through a hose (not shown) connected to media receiver 316, as illustrated in FIGS. 6 and 7.

System 300 may also comprise a fifth conveying tank 350 connected to an inlet valve (not indicated) of the media distribution valve 314 via a hose (not shown). Similar to the arrangement with conveying tanks 328, 330, 332, and 348, conveying tank 350 is preferably disposed beneath its own particulate media resistant valve 382, which is preferably disposed beneath its own media storage hopper 346. Media received in storage hopper 346 may pass through particulate media resistant valve 382 and into conveying tank 350 to be conveyed through the media distribution valve 314 to another destination. For example, media may be conveyed from tank 350 through valve 314 through a hose (not shown) connected to media receiver 316, as illustrated in FIGS. 6 and 7. As shown in FIGS. 6 and 7, components 344, 380, 344, 346, 382, and 346 are part of an automated blast chamber 310 having a clear door 356.

Blast chamber 310 is preferably in communication with one or more blast dispenser units such as units 306 and 308 illustrated in FIGS. 6 and 7. These figures particularly illustrate that the blast dispensers 306 and 308 are preferably the novel media dispensing units for precisely, consistently, and reliably propelling a wide range of particulate media disclosed in U.S. patent application Ser. No. 13/772,624, assigned to the assignee of the present application, Comco Inc., and incorporated by reference in its entirety.

System 300 may also comprise an optional spiral separator 304. Spiral separator 304 may comprise a sixth conveying tank 356 connected to an inlet valve (not indicated) of the media distribution valve 314 via a hose (not shown) to be conveyed to another destination. For example, media may be conveyed from tank 356 through valve 314 to media receiver 316. Spiral separator 304 may also include a media receiver 352 in communication with the media distribution valve 314 via one or more hoses (not shown), a spiral process unit 354 for removing out-of-round particles, and a waste drum 358.

System 300 may also comprise an optional dust collector 302 that may include a media receiver 360, a dust process unit 362, and a waste drum 364. Dust collector 302 is ideally connected to each media receiver 352, 340, 342, 312 and the automated blast chamber 310 to draw off very fine dust that may be generated.

As discussed above, the media distribution valve 314 illustrated in FIGS. 6 and 7 is preferably a 6-in and 6-out billet design machined from aluminum. Other than the number of inlet and outlets and type of material used to construct media distribution valve 314, this valve 314 is functionally identical to media distribution valve 110 disclosed above. Similarly, the particulate media resistant valves of system 300 are also preferably pneumatic pinch valves like that of system 100. The conveying tanks of system 300 are also preferably positively pressurizable like the conveying tanks of system 100. Also like system 100, the conveying tanks and storage hoppers of system 300 may include their own "full" sensor, level sensor, or the like.

Typical operation of system 300 may involve having a control computer (not shown) of the automated blast chamber 310 select the appropriate storage hopper associated with screen classifier 312 to fill a blast dispensing unit 306 or 308. The computer commands valves (not shown) housed in a control box (not shown) under the screen process unit 318 to actuate the proper pinch valves and conveying tanks, such as pinch valve 334 and conveyor tank 328 to permit media contained with storage hopper 320 to fill blast dispensing unit 306, for example. In a similar manner, another storage hopper of screen classifier 312 may be used to fill the other blast dispensing unit 308, for example. After the blast dispensing units 306 and 308 are filled, they are used to blast or peen parts inside the automated blast chamber 310. Hoppers 344 and 346 on the bottom of the automated blast chamber 310 connect to conveyor tanks 348 and 350, respectively. These tanks 348 and 350 then move the media back to the top of the screen classifier 312. Per aerospace or similar specifications, occasionally the media may need to be run through the spiral separator 304 to remove out-of-round media. To do so, the media is routed through the media distribution valve 314. Indeed all conveying tanks and media receivers of system 300 are preferably routed through media distribution valve 314.

While certain embodiments have been described, the embodiments have been presented by way of example only and are not intended to limit the scope of the inventions. Indeed, the novel devices and methods described herein may be embodied in a variety of other forms; furthermore, various omissions, substitutions, and changes in the form of the devices and methods described herein may be made without departing from the spirit of the inventions. The accompanying claims and their equivalents are intended to cover such forms or modifications as would fall within the scope and spirit of the inventions.

The invention claimed is:

1. A system comprising:
   a conveying tank; and
   a media distribution valve in communication with the conveying tank, wherein the media distribution valve comprises a vertical central passageway, a first particulate media resistant valve connected to and angled away from the vertical central passageway, a second particulate media resistant valve connected to and angled away from the vertical central passageway, and a third particulate media resistant valve connected to and extending axially away from the vertical central passageway;
   said tank feeding to the media distribution valve, and a blast dispenser being fed by the media distribution valve.

2. The system of claim 1, wherein the first particulate media resistant valve is a pinch valve.

3. The system of claim 1, wherein the media distribution valve further comprises an auxiliary air port connected to the vertical central passageway.

4. The system of claim 1, further comprising a working fluid inlet in line with a bottom port of the conveying tank.

5. The system of claim 4, further comprising a flow meter in communication with the working fluid inlet.

6. The system of claim 1, further comprising a conveying tank sensor in communication with the conveying tank to detect media level within the conveying tank.

7. The system of claim 1, further comprising a pinch valve in communication with the conveying tank to control entry of media into the conveying tank.

8. The system of claim 7, further comprising a media storage hopper disposed about the pinch valve, and a media storage hopper sensor in communication with the media storage hopper to detect media level within the media storage hopper.

9. The system of claim 1, further comprising a blast chamber in communication with the blast dispenser and the media distribution valve, and a screen classifier in communication with the media distribution valve.

* * * * *